United States Patent

Takahata

(10) Patent No.: US 9,748,598 B2
(45) Date of Patent: Aug. 29, 2017

(54) BATTERY PACK

(71) Applicant: TOYOTA JIDOSHA KABUSHIKI KAISHA, Toyota-shi, Aichi-ken (JP)

(72) Inventor: Koji Takahata, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 46 days.

(21) Appl. No.: 14/975,805

(22) Filed: Dec. 20, 2015

(65) Prior Publication Data

US 2016/0190634 A1 Jun. 30, 2016

(30) Foreign Application Priority Data

Dec. 25, 2014 (JP) ................................. 2014-262102

(51) Int. Cl.
| | |
|---|---|
| *H01M 2/02* | (2006.01) |
| *H01M 10/04* | (2006.01) |
| *H01M 2/10* | (2006.01) |
| H01M 10/0525 | (2010.01) |
| H01M 10/0587 | (2010.01) |
| H01M 10/647 | (2014.01) |
| H01M 10/6557 | (2014.01) |
| H01M 10/613 | (2014.01) |

(52) U.S. Cl.
CPC ..... *H01M 10/0468* (2013.01); *H01M 2/0237* (2013.01); *H01M 2/1077* (2013.01); *H01M 10/0431* (2013.01); *H01M 10/0481* (2013.01); *H01M 2/024* (2013.01); *H01M 2/0207* (2013.01); *H01M 10/0525* (2013.01); *H01M 10/0587* (2013.01); *H01M 10/613* (2015.04); *H01M 10/647* (2015.04); *H01M 10/6557* (2015.04); *H01M 2220/20* (2013.01); *Y02E 60/122* (2013.01)

(58) Field of Classification Search
CPC .................. H01M 10/0468; H01M 2/0237
See application file for complete search history.

(56) References Cited

U.S. PATENT DOCUMENTS

| | | |
|---|---|---|
| 2007/0122695 A1 | 5/2007 | Kim et al. |
| 2011/0008656 A1 | 1/2011 | Tanahashi et al. |
| 2011/0070476 A1 | 3/2011 | Takahashi et al. |

(Continued)

FOREIGN PATENT DOCUMENTS

| | | |
|---|---|---|
| EP | 2248207 A1 | 11/2010 |
| JP | 2009212055 A | 9/2009 |

(Continued)

*Primary Examiner* — Olatunji Godo
(74) *Attorney, Agent, or Firm* — Sughrue Mion, PLLC

(57) ABSTRACT

A battery pack includes a plurality of non-aqueous electrolyte single cells, each single cell being such that a rolled electrode body is housed in a flat case; a plurality of spacers; and a banding member. The rolled electrode body includes a collector portion, and a power generating portion. Each spacer has a recessed portion provided on at least one surface that faces the adjacent single cell. A side plate of the case that faces the surface of the spacer on which the recessed portion is provided includes a thick portion that contacts the power generating portion of the rolled electrode body inside the case, and a thin portion that is thinner than the thick portion and is continuous with both sides of the thick portion in the rolling axis direction. The surface of the spacer on which the recessed portion is provided abuts against only the thick portion.

8 Claims, 9 Drawing Sheets

(56) References Cited

U.S. PATENT DOCUMENTS

2012/0070711 A1     3/2012   Souki et al.
2014/0295220 A1    10/2014   Mori et al.

FOREIGN PATENT DOCUMENTS

| | | |
|---|---|---|
| JP | 2013-161762 A | 8/2013 |
| JP | 2014086291 A | 5/2014 |
| JP | 2014-154484 A | 8/2014 |
| KR | 1020100110386 A | 10/2010 |
| WO | 2009109834 A1 | 9/2009 |

BATTERY PACK

INCORPORATION BY REFERENCE

The disclosure of Japanese Patent Application No. 2014-262102 filed on Dec. 25, 2014 including the specification, drawings and abstract is incorporated herein by reference in its entirety.

BACKGROUND OF THE INVENTION

1. Field of the Invention

The invention relates to a battery pack. More particularly, the invention relates to a battery pack in which a plurality of single cells and a plurality of spacers are juxtaposed in a predetermined direction, and a juxtaposed body of these single cells and spacers (i.e., a body formed by these juxtaposed single cells and spacers) is banded together while being pressed in the predetermined direction. Each of the single cells is a non-aqueous electrolyte cell in which a rolled electrode body that is flatly rolled is housed in a flat case.

2. Description of Related Art

Japanese Patent Application Publication No. 2014-154484 (JP 2014-154484 A), for example, describes a battery pack in which a plurality of flat single cells and a plurality of spacers are alternately juxtaposed. Each of the single cells is a non-aqueous electrolyte cell in which an electrolyte and a rolled electrode body are housed in a flat case. Each of the spacers is made of an insulating body, and is spaced between adjacent single cells in order to insulate the cases of adjacent single cells and inhibit a rise in temperature of the single cells. With the battery pack described in JP 2014-154484 A, pressure in a predetermined direction is applied to the juxtaposed body of single cells, and in each single cell, the rolled electrode body inside the flat case is sandwiched from both sides by a pair of side plates of the flat case, in order to prevent the rolled electrode body from vibrating inside the flat case when the battery pack vibrates. To simplify the description, the predetermined direction will hereinafter be referred to as the "juxtaposing direction". The pressure in the juxtaposing direction is applied to the rolled electrode body via the spacer and the case side plate. With the battery pack described in JP 2014-154484 A, a plurality of grooves are provided in a contact surface of the spacer that contacts the single cell in order to further inhibit a rise in the temperature of the single cell. A cooling medium (air) flows through these grooves to inhibit a rise in the temperature of the single cell (see paragraph [0060] and FIG. 9 in JP 2014-154484 A). The battery pack in JP 2014-154484 A is designed to be mounted in an electric vehicle, as a power supply for a running motor. In an electric vehicle, a vibration countermeasure is particularly important.

SUMMARY OF THE INVENTION

In this specification, a side plate facing the juxtaposing direction of the flat case will be referred to as a "wide side plate", and a side plate of the case that intersects with the rolling axis of the rolled electrode body will be referred to as a "narrow side plate", to simplify the description. Edges of the wide side plate and the edges of the narrow side plate are connected together, and these boundaries form one side of the case. The wide side plate abuts against a spacer. Also, to simplify the description, pressure in the juxtaposing direction may be referred to as "stacking pressure". A spacer having a plurality of grooves in an abutting surface that abuts with the wide side plate may be referred to as a "comb spacer". Further, the rolled electrode body may be referred to simply as an "electrode body". The electrode body is formed by a positive electrode sheet, a negative electrode sheet, and a separator sandwiched therebetween, that have been flatly rolled. A collector portion is provided on both ends of the electrode body in the rolling axis direction, and a portion sandwiched between the collector portion on both ends will be referred to as the "power generating portion". At the collector portion, only one sheet, either the positive electrode sheet or the negative electrode sheet, is rolled, so the thickness of the collector portion is thinner than the thickness of the power generating portion.

The stacking pressure is transmitted to the electrode body inside the case via the wide side plate, so the thickness of the wide side plate is preferably moderately thin. When the comb spacer is abutted and pressed against the thin wide side plate, the wide side plate deforms ever so slightly in a serrated shape due to the serrations of the comb, so the distribution of pressure applied to the electrode body becomes slightly uneven. Meanwhile, the electrode body expands when charging, and contracts when discharging. Therefore, the pressed electrode body (particularly the power generating portion) releases and absorbs electrolyte from both side portions in the rolling axis direction. The slight unevenness in the distribution of the stacking pressure applied to the electrode body (particularly the power generating portion) leads to an increase in the unevenness in the electrolyte distribution within the electrode body each time electrolyte moves in and out. When the unevenness in the electrolyte distribution within the electrode body increases, battery performance decreases.

On the other hand, if the thickness of the wide side plate is increased, the surface of the wide side plate on the electrode body side is able to remain flat even if the comb spacer abuts against it. However, in this instance, the rigidity of the entire wide side plate increases, and the entire wide side plate bends between the narrow side plates on both sides, such that an uneven pressure distribution in which the pressure is high at the center of the electrode body and decreases toward the narrow side plates at the ends is created.

The invention thus provides a battery pack in which a plurality of single cells and spacers are alternately juxtaposed in a predetermined direction (a juxtaposing direction), and are banded together while being pressed in the juxtaposing direction, in which evenly distributed pressure is applied to an electrode body inside a case.

One aspect of the invention relates to a battery pack that includes a plurality of non-aqueous electrolyte single cells, each single cell being such that a rolled electrode body in which a positive electrode sheet, a negative electrode sheet, and a separator sandwiched therebetween are flatly rolled, is housed in a flat case; a plurality of spacers that are juxtaposed in a predetermined direction alternately with the plurality of single cells; and a banding member that applies pressure in the predetermined direction to a juxtaposed body that includes the plurality of single cells and the plurality of spacers, and bands the juxtaposed body together. The rolled electrode body includes a collector portion provided on both ends in a rolling axis direction, and a power generating portion positioned between the collector portion on both ends. Each spacer has a recessed portion provided on at least one surface that faces the adjacent single cell. A side plate of the case that faces the surface of the spacer on which the recessed portion is provided includes a thick portion that contacts the power generating portion of the rolled electrode body inside the case, and a thin portion that is thinner than the thick portion and is continuous with both sides of the thick portion in the rolling axis direction. The surface of the spacer on which the recessed portion is provided abuts against only the thick portion.

With the battery pack according to this aspect, a thick portion that is thick enough not to deform even when the comb-shaped serrations abut against it, is provided on a portion of the wide side plate that the comb spacer abuts against. Meanwhile, a thin portion that is thinner than the thick portion is provided in a portion that is continuous with both sides of the thick portion in the rolling axis direction. When the wide side plate receives pressure, the thin portion deforms before the thick portion deforms. When the thin portion deforming, the entire thick portion consequently moves in the juxtaposing direction by the pressure in the juxtaposing direction, while remaining flat in the rolling axis direction, and thus applies pressure that is evenly distributed to the power generating portion.

The thin portion may be provided on both sides of the thick portion, in a direction orthogonal to both the juxtaposing direction and the rolling axis direction (i.e., in a case height direction). The thin portion is not always necessary in the case height direction. The electrolyte moves in the rolling axis direction following expansion and contraction of the rolled electrode body, so unevenness in the pressure distribution along the path along which the electrolyte moves effects the distribution of the electrolyte. Movement of the electrolyte in the case height direction is small compared to movement of the electrolyte in the rolled axis direction. Therefore, even without the thin portion provided on both sides of the thick portion in the case height direction, the effect in which unevenness in the electrolyte distribution is suppressed by providing the thin portion on both sides of the thick portion in the rolling axis direction can still be expected. That is, one problem to be solved by the aspect of the invention is to make the pressure distribution in the rolling axis direction that is applied to the rolled electrode body uniform.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
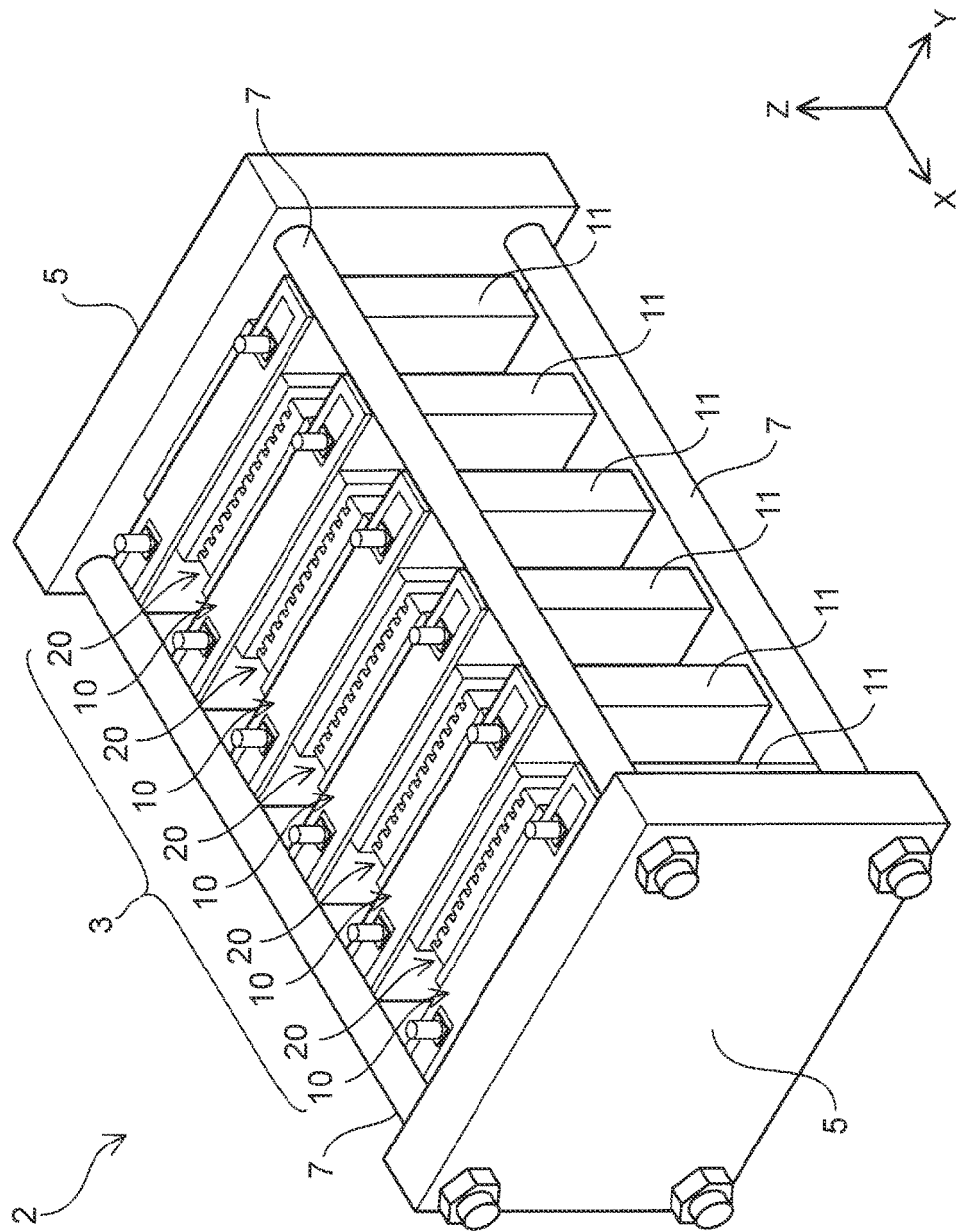
FIG. 1 is a perspective view of a battery pack according to an example embodiment of the invention.

A battery pack according to an example embodiment of the invention will now be described with reference to the accompanying drawings. First, the structure of the battery pack 2 according to the example embodiment will be described with reference to FIG. 1. FIG. 1 is a perspective view of the battery pack 2 according to the example embodiment. The battery pack 2 includes a plurality of single cells 10 and a plurality of spacers 20 that are juxtaposed and banded together. Each single cell 10 is a sealed cell that is a non-aqueous electrolyte secondary cell in which an electrolyte and an electrode body are housed together in a cell case 11 formed in a flat rectangular shape, as will be described in detail later. Electrolyte is sealed inside the cell case 11. The single cells 10 may also be referred to as "battery cells".

The plurality of single cells 10 are electrically connected together in series, such that the battery pack 2 is able to output power of a large voltage. A connecting plate that electrically connects terminals of adjacent single cells 10 is not shown in the drawings. The battery pack 2 is mounted in a hybrid vehicle or an electric vehicle or the like, and supplies power for driving a running motor, for example. With the battery pack 2 mounted in a vehicle, pressure is applied in the juxtaposing direction of the single cells 10 to protect the electrode bodies inside the cell cases 11 from vibration input from the road surface and the like while traveling. As described earlier, pressure in the juxtaposing direction will be referred to as "stacking pressure". The battery pack 2 includes a pair of end plates 5 and banding bands 7. Pressure in the juxtaposing direction is applied to each of the plurality of single cells 10 by these members. The juxtaposing direction corresponds to the X-axis direction in the drawing. The same is also true for the drawings described below.

The battery pack 2 is formed by a battery stack 3 (a juxtaposed body, i.e., a body formed by juxtaposed components), the pair of end plates 5, and the banding bands 7. The battery stack 3 (the juxtaposed body) is a device in which the plurality of single cells 10 and the plurality of spacers 20 are juxtaposed alternately one-by-one. The pair of end plates 5 sandwich the battery stack 3 from the juxtaposing direction. The banding bands 7 squeeze the battery stack 3 in a direction that closes the distance between the pair of end plates 5. Each spacer 20 is sandwiched between two adjacent single cells 10. The banding bands 7 are formed by four long bolts that pass through through-holes provided in the four corners of each of the two end plates 5, and nuts that are screwed onto end portions of the banding bands 7 and press the battery stack 3 that is sandwiched between the pair of end plates 5 in the juxtaposing direction. With this kind of pressing mechanism, the spacers 20 interposed between adjacent single cells 10 press on the side plates of the cell cases 11 of the single cells 10. The pair of side plates of each cell case 11 that face the juxtaposing direction will hereinafter be referred to as "wide side plates".

Figure 2:
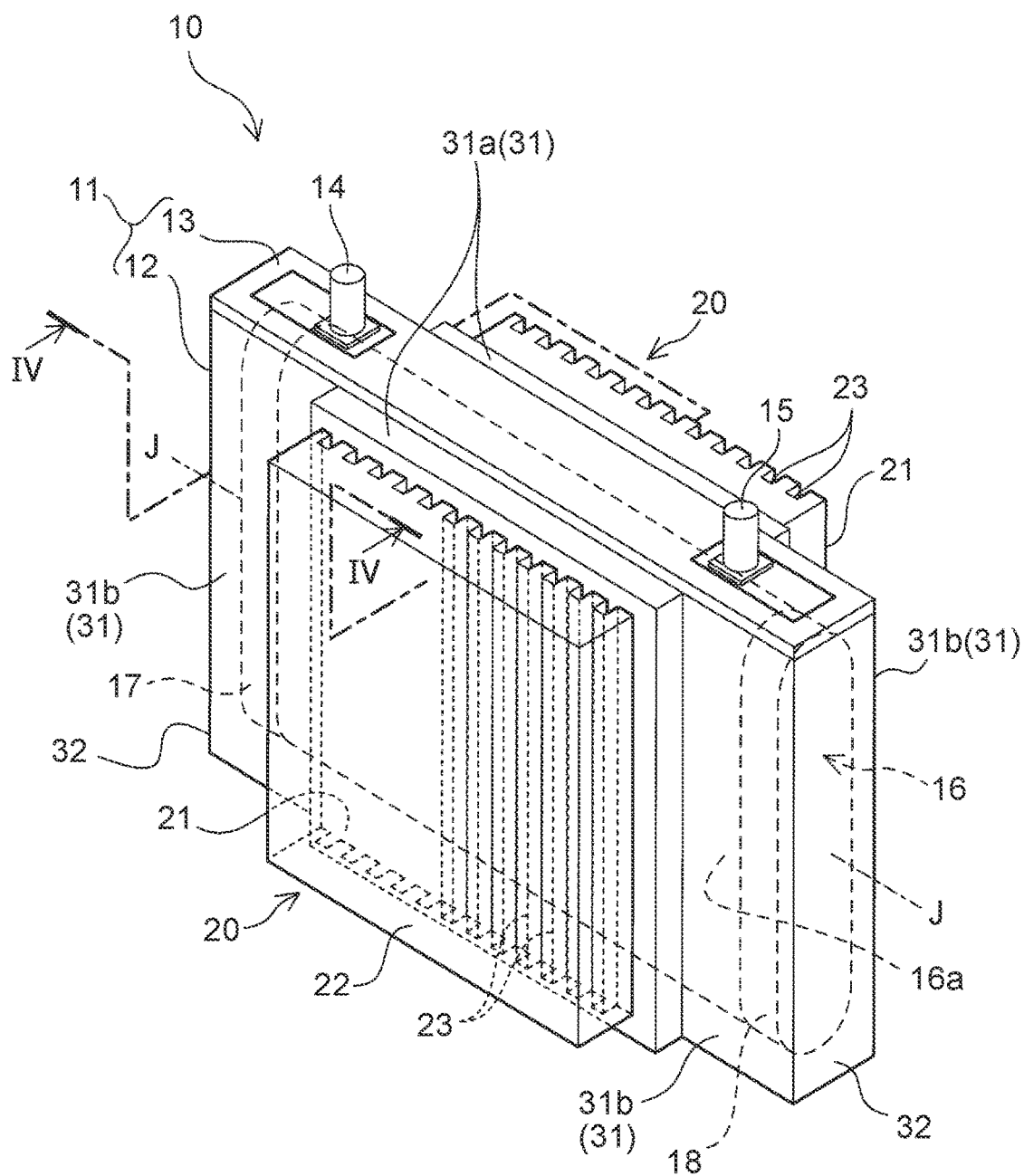
FIG. 2 is a perspective view of a portion of a battery stack.
Figure 2:
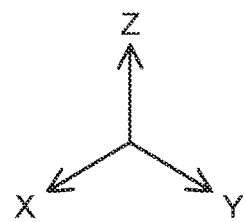
Figure 3:
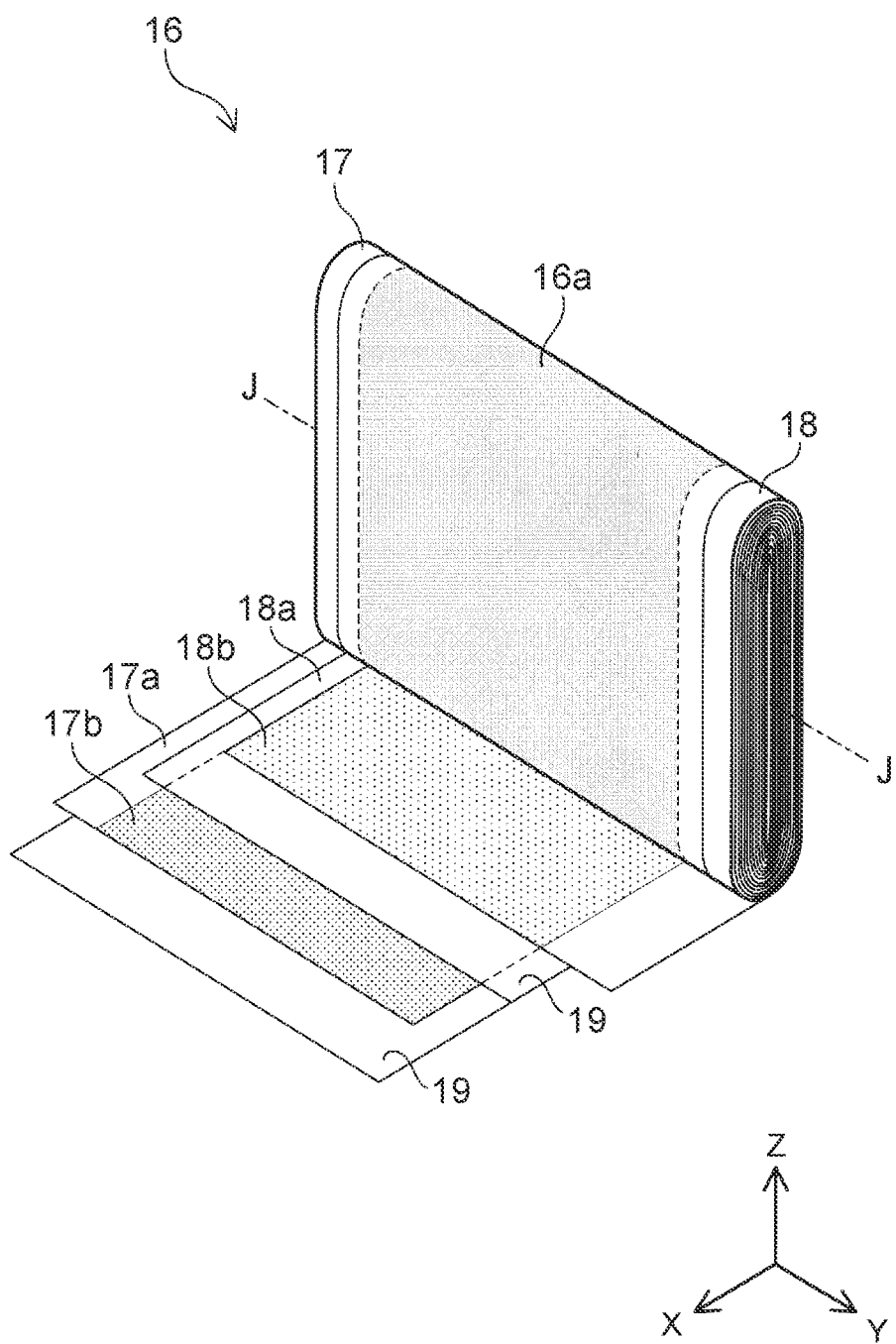
FIG. 3 is an explanatory view of a configuration example of an electrode body.

Next, the single cells 10 that are pressed on by the spacers 20, as a portion of the battery stack 3, will be described with reference to FIGS. 2 and 3. FIG. 2 is a perspective view of a portion of the battery stack 3, and FIG. 3 is an explanatory view illustrating a configuration example of a rolled electrode body 16. Hereinafter, the rolled electrode body 16 will simply be referred to as "electrode body 16", to simplify the description. The single cell 10 mainly includes the cell case 11, the rolled electrode body 16, and the electrolyte, as outlined above. The electrolyte is not shown in the drawings. As shown in FIG. 2, the cell case 11 includes a closed-end cylindrical case main body 12 and a cover 13 that closes off an upper opening of the case main body 12. The case main body 12 has a long narrow box shape (a flat rectangular shape) in which the length in the Y-axis direction in the drawing is the longest, and the length in the X-axis direction is significantly shorter than the lengths in the Y-axis direction and the Z-axis direction. As described earlier, the side plate of the case main body 12 that faces the juxtaposing direction will be referred to as the wide side plate 31. This wide side plate 31 is provided with a thick portion 31a and a thin portion 31b, as will be described later. Also, the side plate of the case main body 12 that faces the direction of a rolling axis J of the electrode body 16 that will be described later, will be referred to as a narrow side plate 32. The direction of the rolling axis J corresponds to the Y-axis direction of the coordinate system in the drawings. This is also true for the drawings described below.

The cover 13 has a strip shape corresponding to the long narrow upper opening of the case main body 12, and closes off the upper opening in a liquid-tight manner. Both the case main body 12 and the cover 13 are made of aluminum.

The electrode body 16 that is rolled in a flat shape is housed in the case main body 12, and electrolyte in which the housed electrode body 16 is immersed, is filled in the case main body 12. A positive terminal 14 and a negative terminal 15 that protruded via an insulating holder or the like are provided on the cover 13. The single cell 10 is a rectangular sealed lithium-ion secondary cell, for example. In addition to the positive terminal 14 and the negative terminal 15, a filler hole for filling the electrolyte into the cell case 11, and a safety valve that prevents the internal pressure of the cell case 11 from rising, and the like are also provided in the cover 13, but these are not shown.

The electrode body 16 is a rolled electrode body in which a layered body of a positive electrode sheet 17a, a negative electrode sheet 18a, and a separator 19 interposed therebetween, is rolled in a flat shape, as shown in FIG. 3. A positive electrode active material layer 17b is formed on the positive electrode sheet 17a, and a negative electrode active material layer 18b is formed on the negative electrode sheet 18a. These sheets 17a and 18a are rolled offset from one another by a predetermined distance in the direction of the rolling axis J. Therefore, the area where the positive electrode sheet 17a and the negative electrode sheet 18a overlap via the separator 19 functions as a power generating portion 16a (the gray-colored portion in FIG. 3). The area where the positive electrode sheet 17a and the negative electrode sheet 18a overlap via the separator 19 is more accurately a portion where the positive electrode active material layer 17b of the positive electrode sheet 17a overlaps with and the negative electrode active material layer 18b of the negative electrode sheet 18a via the separator 19.

A positive electrode collector portion 17 is provided on one side of the power generating portion 16a in the rolling axis direction J, and a negative electrode collector portion 18 is provided on the other side. The positive electrode collector portion 17 is a portion where only the positive electrode sheet 17a is rolled, of the electrode body 16 in which the positive electrode sheet 17a and the like are rolled. The negative electrode collector portion 18 is a portion where only the negative electrode sheet 18a is rolled, of the electrode body 16 in which the positive electrode sheet 17a and the like are rolled. Therefore, the thickness in the short direction of the positive electrode collector portion 17 and the negative electrode collector portion 18 is thinner than the thickness in the short direction of the power generating portion 16a. The short direction of the positive electrode collector portion 17, the negative electrode collector portion 18, and the power generating portion 16a matches the juxtaposing direction of the plurality of single cells 10 and the plurality of spacers 20. It should be kept in mind that in FIGS. 2 and 3, the thickness of the positive electrode collector portion 17 and the negative electrode collector portion 18 in the juxtaposing direction is depicted as being the same as the thickness of the power generating portion 16a to simplify the drawings.

The positive terminal 14 and the negative terminal 15 provided on the cover 13 are connected to the positive electrode collector portion 17 and the negative electrode collector portion 18, respectively, of the rolled electrode body 16. When the electrode body 16 that is immersed in the electrolyte generates power, that power is output to an external device via the positive terminal 14 and the negative terminal 15. Also, the electrode body 16 is charged by power supplied from an external device being input from the positive terminal 14 and the negative terminal 15.

Returning now to FIG. 2, the battery stack 3 will continue to be described. The spacer 20 is a rectangular thick plate having an outer shape that is smaller than that of the wide side plate 31 of the cell case 11 of the single cell 10. This spacer 20 is interposed between juxtaposed single cells 10 to ensure a gap between adjacent single cells 10, and applies pressure (stacking pressure) from the pressing mechanism to the wide side plate 31 of the cell case 11. In this example embodiment, the spacer 20 is made a size in which a planar shape thereof is a rectangular shape that is smaller than the thick portion 31a. The planar shape is the shape of a surface viewed from the juxtaposing direction of the plurality of single cells 10.

A plurality of grooves 23 that extend in striations in one surface 21 that faces the juxtaposing direction are provided in the spacer 20. In this example embodiment, the spacer 20 contacts the wide side plate 31 of the cell case 11 such that the grooves 23 extend in a height direction (i.e., the Z-axis direction in FIG. 1) of the single cell 10. The one surface 21 of the spacer 20 in which the grooves 23 are provided abuts against the wide side plate 31 of the cell case 11. Thus, a plurality of flow paths that extend in the Z-axis direction and are surrounded by the front surface of the wide side plate 31 and the side and bottom surfaces of the grooves 23 are formed. Each flow path passes through in the Z-axis direction. Air flows through the flow paths to cool the single cell 10 that generates heat by charging and discharging. In FIG. 2, the grooves 23 are denoted by broken lines. Some of the grooves 23 in the one surface 21 of the spacer 20 are omitted, but this omission is only to prevent the broken lines of the grooves 23 and line IV-IV (an alternate long and short dash line) and the like from crossing and becoming confused with each other. In actuality, the grooves 23 are formed in the entire surface of the one surface 21 of the spacer 20.

In this example embodiment, the plurality of grooves 23 are provided in the one surface 21 of the spacer 20 that faces the juxtaposing direction. Grooves are not formed in the other surface 22. However, a plurality of grooves may also be formed in the other surface 22. Also, as described earlier, the spacer 20 is made a size in which the planar shape thereof is a rectangular shape that is smaller than the thick portion 31a. Therefore, the surface 21 provided with the grooves 23 contacts the cell case 11 only at the thick portion 31a.

When pressure from the pressing mechanism is applied in the juxtaposing direction of the single cell 10, the one surface 21 of the spacer 20 with the plurality of grooves 23 contacts the wide side plate 31 of the cell case 11 in a comb-like discontinuous manner. Therefore, portions where pressure is applied are mixed with portions where pressure is not applied, on the surface of the wide side plate 31. That is, when the spacer 20 having the grooves 23 abuts against the wide side plate 31, unevenness in the pressure distribution is created on the surface of the wide side plate 31. If the wide side plate is uniformly thin, the wide side plate will deform slightly in a serrated shape corresponding to the unevenness of the pressure distribution. As a result, pressure of a slightly uneven distribution will be applied to the electrode body 16 that is abutting against the inside surface (i.e., the surface facing the case inside) of the wide side plate. Meanwhile, the electrode body 16 will repeatedly expand and contract with charging and discharging. The electrode body 16 absorbs electrolyte from the surrounding area when expanding, and discharges absorbed electrolyte when contracting. When pressure of an uneven distribution is applied to the electrode body 16, or more particularly, to the power generating portion 16a, variation in the electrolyte distribution inside the power generating portion 16a increases, while electrolyte is repeatedly absorbed and discharged. When this variation in the electrolyte distribution inside the power generating portion 16a becomes large, battery performance ends up decreasing. Therefore, it is desirable that the distribution of pressure applied to the power generating portion 16a be as even as possible. If the thickness of the entire wide side plate 31 is increased, deformation of the wide side plate caused by the grooves 23 will not occur even if the comb-shaped spacer 20 is abutting against the wide side plate 31. However, if the entire wide side plate is highly rigid, the pressure applied from the outside in order to apply a predetermined pressure to the power generating portion 16a must be increased. As a result, the entire wide plate will bend between the contact locations (i.e., the corners extending in the height direction of the case main body 12) of the narrow side plates 32 on both sides, and an uneven pressure distribution in which the pressure is high at the center of the electrode body and decreases toward the narrow side plates 32 will end up being created. The narrow side plates are the pair of side plates of the cell case 11 that intersect with the rolling axis J.

Therefore, in this example embodiment, the thick portion 31a is provided on the side surface of the cell case 11, and the wide side plate 31 that is thinner than the thick portion is provided on a portion that is continuous with both sides of the thick portion 31a in the rolling axis direction. The surface 21 of the spacer 20 in which the grooves 23 are provided abuts only against the thick portion 31a. As a result, deformation of the wide side plate 31 (i.e., the thick portion 31a) due to the grooves 23 of the spacer 20 is suppressed, and when stacking pressure is received, the thin portion 31b deforms and the entire thick portion 31a moves in the juxtaposing direction, such that pressure is applied evenly to the power generating portion 16a.

Figure 4:
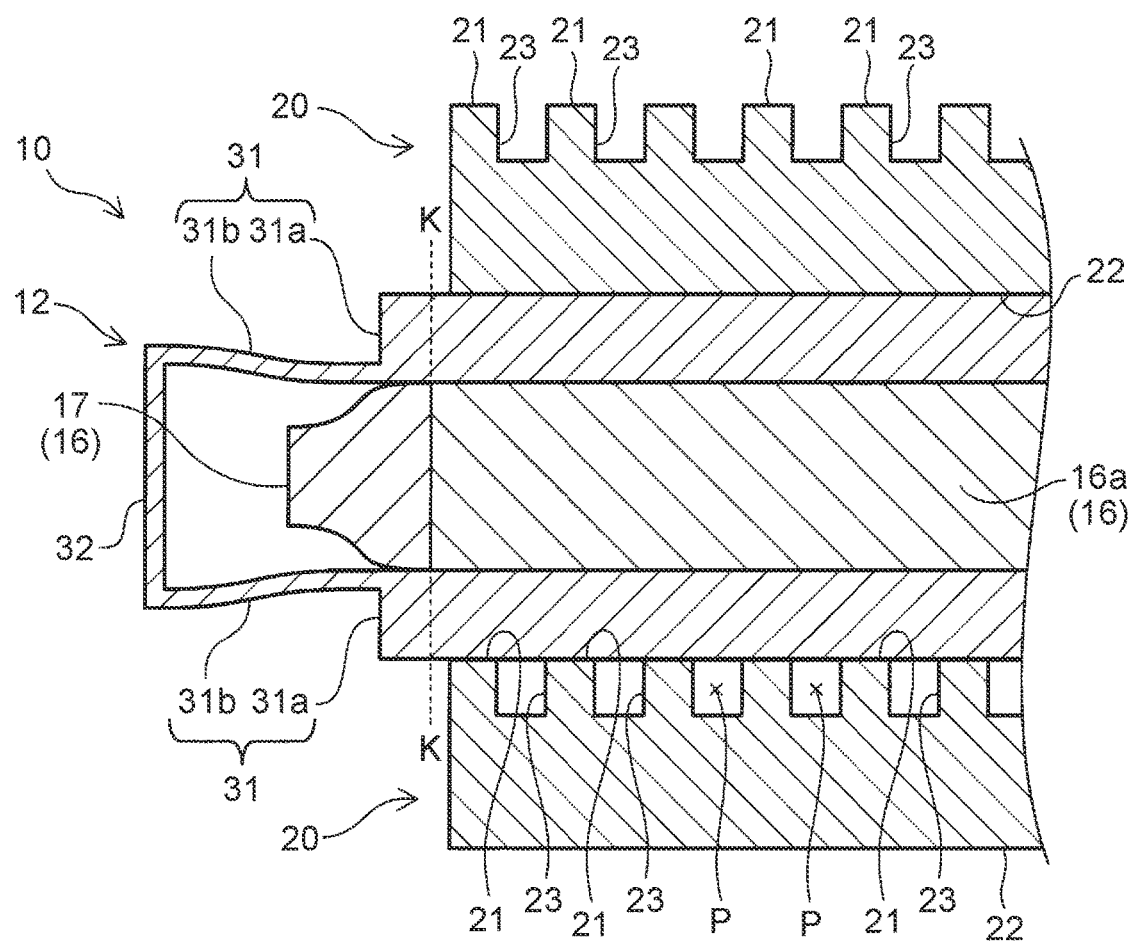
FIG. 4 is a sectional view taken along line IV-IV in FIG. 2.
Figure 5:
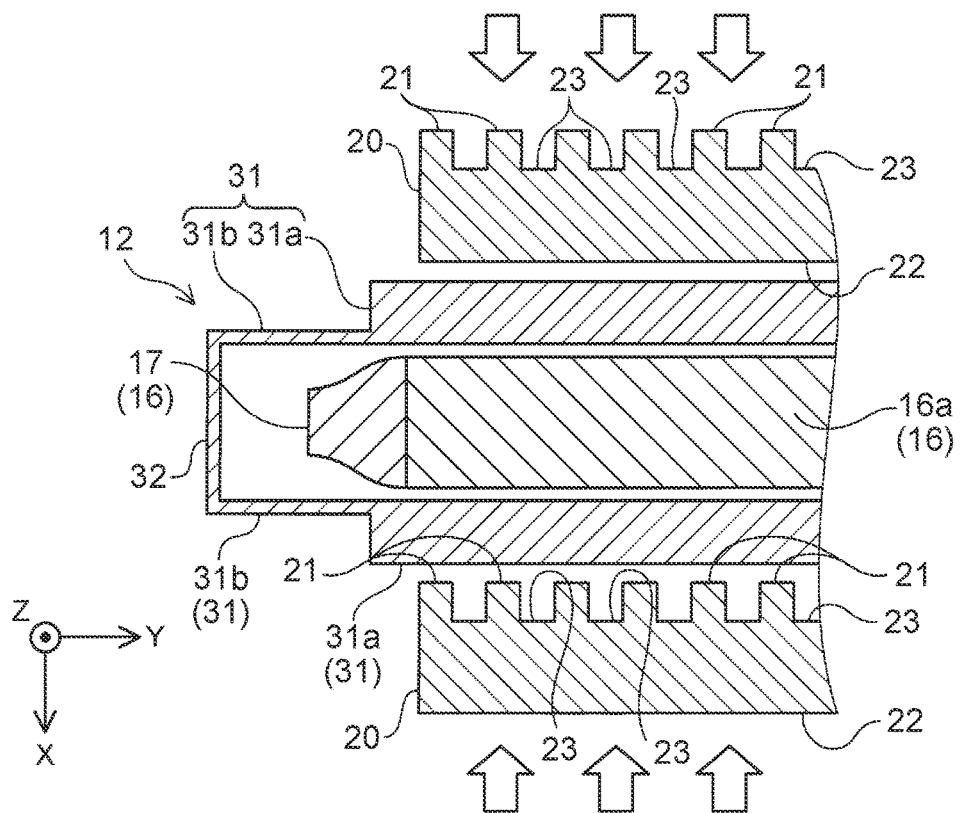
FIG. 5 is an explanatory view of a modified example of a cell case before stacking pressure is applied.
Figure 6:
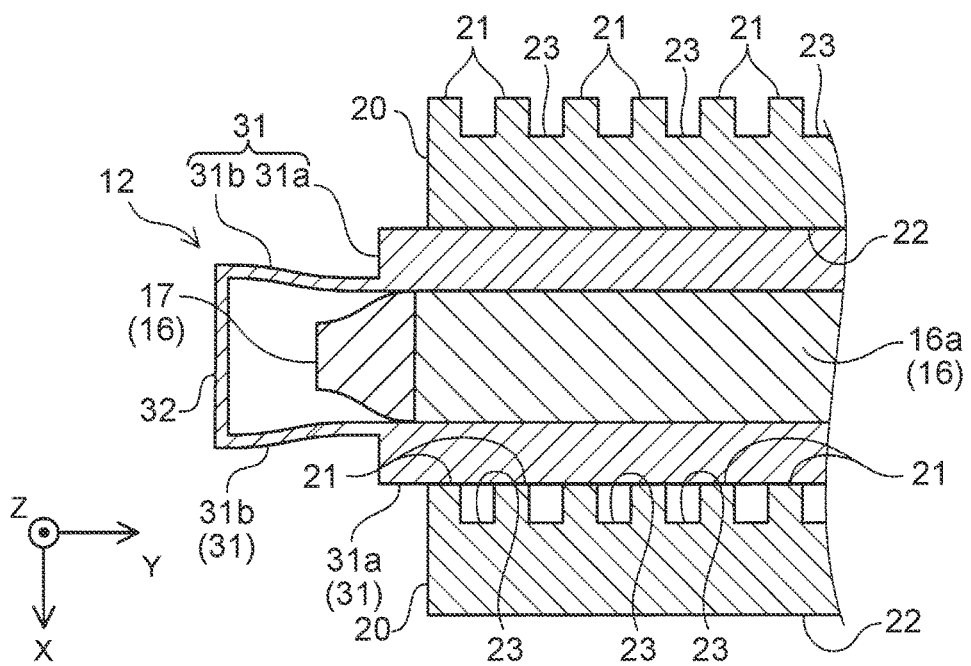
FIG. 6 is an explanatory view of a modified example of a cell case after stacking pressure is applied.

FIG. 4 is a sectional view taken along line IV-IV in FIG. 2. Also, FIGS. 5 and 6 are explanatory views illustrating deformation of the cell case 11 before and after stacking pressure is applied. FIG. 5 is a view of the state before stacking pressure is applied, and FIG. 6 is a view of the state after stacking pressure is applied. Hereinafter, the description will continue with reference to FIGS. 4 to 6 as well.

FIG. 4 is a view of the left side of a cross-section in which the single cell 10 and the spacer 20 are cut along the XY plane. Therefore, the structure symmetrically showing this cross-section also appears on the right side. The same is also true for FIGS. 5 and 6. Also, in the electrode body 16 in these sectional views, the stacked positive electrode sheet 17a, negative electrode sheet 18a, and separator 19 appear as multiple layers, but it should be noted that the cross-sections of the stacked positive electrode sheet 17a, negative electrode sheet 18a, and separator 19 are collectively represented by simple hatching in FIGS. 4 to 6 for descriptive purposes. Furthermore, the positive electrode collector portion 17 forms a portion of the electrode body 16, but in order to clearly distinguish the positive electrode collector portion 17 from the power generating portion 16a, the two are indicated by hatching in different directions. Also, in these drawings, reference character 21 that denotes the one surface and reference character 23 that denotes the grooves are provided for only a portion of the one surface and the grooves. There are portions of the one surface and the grooves that are not provided with these reference characters.

As shown in FIG. 4, the thick portion 31a and the thin portion 31b are provided on the wide side plate 31 of the case main body 12. More specifically, the thick portion 31a is provided in an area of the inside surface (i.e., the surface facing the electrode body 16) of the wide side plate 31 that contacts the power generating portion 16a. Also, the thin portion 31b is provided on both sides in the rolling axis direction (i.e., the Y-axis direction in the drawing) of the thick portion 31a. The thin portion 31b is a portion that is continuous with both sides of the thick portion 31a in the rolling axis direction, and connects both ends of the thick portion 31a to the narrow side plates 32. In this example embodiment, the inside surfaces of the thick portion 31a and the thin portion 31b are flush, and the thick portion 31a protrudes out farther than the thin portion 31b in the juxtaposing direction on the outside of the case main body 12.

In the example shown in FIG. 4, the size of the thick portion 31a is such that the thick portion 31a extends beyond a boundary K between the power generating portion 16a and the positive electrode collector portion 17, to near a long direction end portion of the single cell 10 (in a negative direction of the Y-axis in FIG. 4). In other words, the size of the thick portion 31a is such that the thick portion 31a extends beyond the area where the power generating portion 16a is in contact, to near the long direction end portion of the single cell 10. This thick portion 31a is formed in a strip shape from one end side to the other end side of the case main body 12 in the height direction (the Z-axis direction; the direction orthogonal to the rolled axis J) of the single cell 10, i.e., a direction perpendicular to the paper on which FIG. 4 is drawn (see FIG. 2). If a positive direction of the Z-axis is defined as "up" and a negative direction of the Z-axis is defined as "down", the thick portion 31a is formed in a strip shape from the lower end to the upper end of the case main body 12. Reference character P in FIG. 4 denotes coolant flow paths formed by the grooves 23 and the thick portion 31a.

In the case main body 12 on which this kind of thick portion 31a is formed, there is a gap between the inside surface of the wide side plate 31 and the housed electrode body 16, as shown in FIG. 5, before pressure (stacking pressure) is applied by the pressing mechanism, and the electrode body 16 is immersed in the electrolyte filled inside the case main body 12. On the other hand, when pressure is applied by the pressing mechanism to the spacer 20 from the direction of the arrows shown in the drawing, the one surface 21 or the other surface 22 is pressed against the thick portion 31a. The one surface 21 or the other surface 22 does not contact the case main body 12 (i.e., the cell case 11) aside from the thick portion 31a. Therefore, the wide side plate 31 of the case main body 12 deforms toward the inside of the case main body 12 around the thick portion 31a. As shown in FIG. 6, the deformation occurs in the thin portion 31b.

That is, the thick portion 31a is more rigid than the thin portion 31b and thus does not deform. Instead, the less rigid thin portion 31b deforms by bending toward the inside of the case main body 12. As a result, the thick portion 31a moves toward the power generating portion 16a without deforming. Also, the comb-shaped serrations from the plurality of grooves 23 formed in the one surface 21 of the spacer 20 press against the thick portion 31a. The thickness of the thick portion 31a is thick enough so that the thick portion 31a does not deform with the serrations of the plurality of grooves 23. As a result, the electrode body 16 housed in the case main body 12 is sandwiched so that it is squeezed from both sides around the power generating portion 16a by the flat thick portion 31a without deforming. Thus, pressure is applied to the electrode body 16 substantially evenly around the power generating portion 16a.

More accurately, the thick portion 31a moves toward the power generating portion 16a while remaining flat in the direction along the rolling axis J. There may be cases in which the thick portion 31a bends in the vertical direction (i.e., the Z-axis direction in the drawing). However, as described earlier, the electrolyte inside moves mainly in the direction of the rolling axis J by the expansion and contraction of the electrode body 16. Therefore, uniformity of the pressure distribution along the rolling axis J is critical for uniformity of the electrolyte distribution inside the electrode body 16. That is, the application of pressure distributed uniformly in the direction of the rolling axis J by the thick portion 31a contributes to the uniformity of the electrolyte distribution inside the electrode body 16.

Also, in FIGS. 4 to 6, the thickness of the positive electrode collector portion 17 in the juxtaposing direction is shown as being smaller than the thickness of the power generating portion 16a. Therefore, the stacking pressure is applied mainly to the power generating portion 16a, and is not applied to the positive electrode collector portion 17 (and the negative electrode collector portion 18). The electrolyte distribution inside the electrode body 16 is able to be uniform if pressure of a uniform distribution is applied to the power generating portion 16a in the direction of the rolling axis J.

Figure 7:
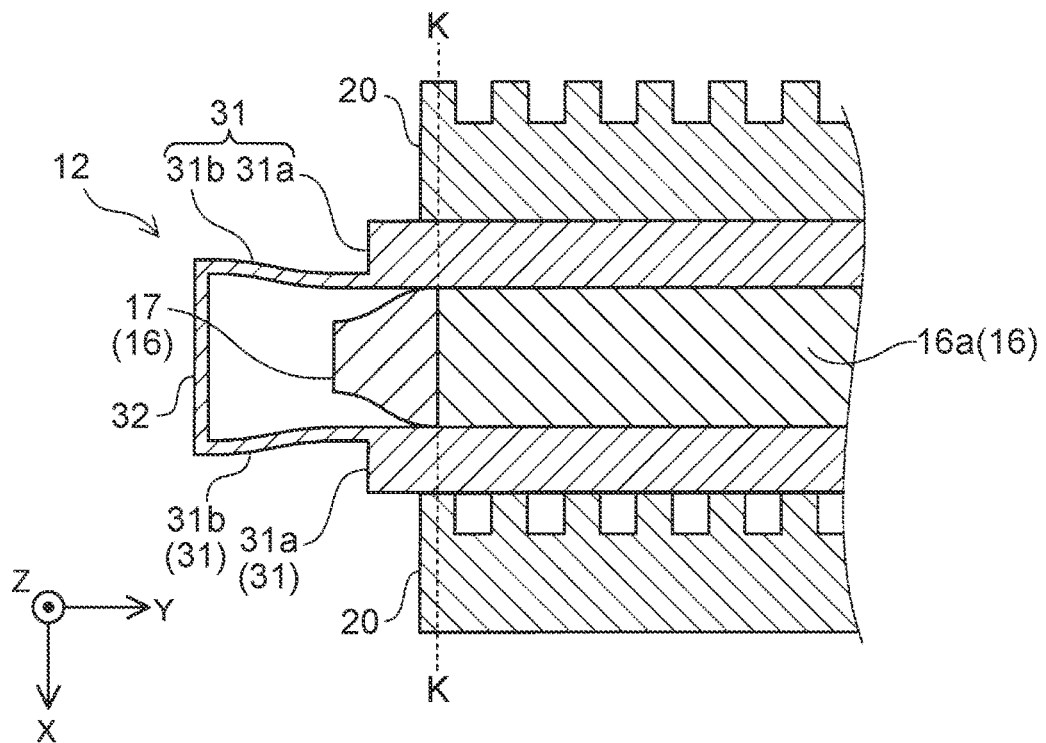
FIG. 7 is a perspective view of the positional relationship of a thick portion and the electrode body (when the thick portion contacts the electrode body beyond the area of a power generating portion)
Figure 8:
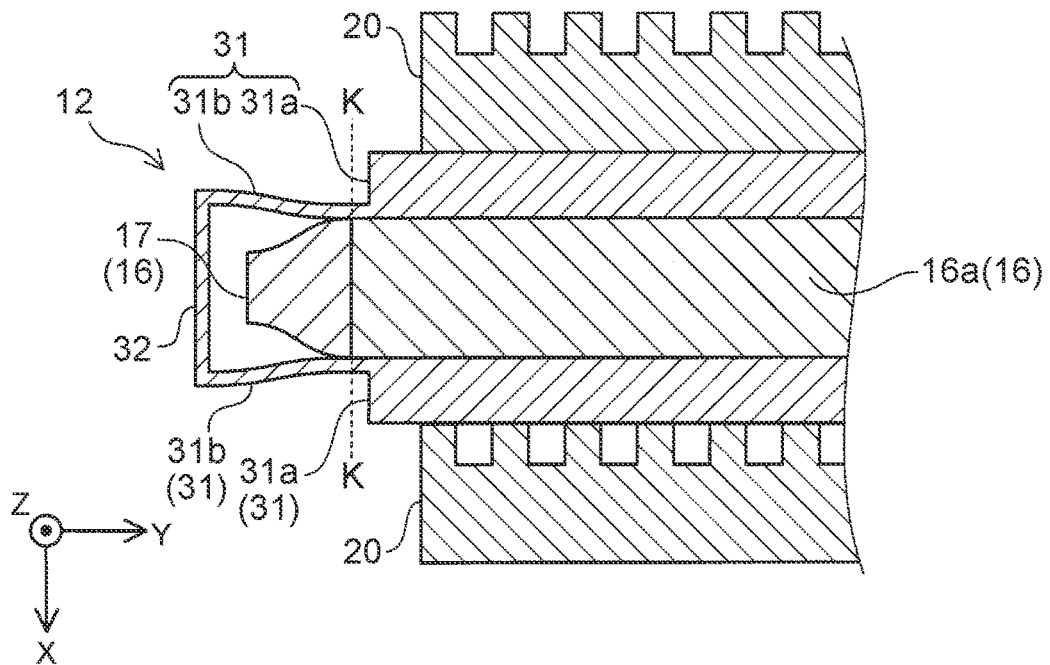
FIG. 8 is a perspective view of the positional relationship of the thick portion and the electrode body (when the thick portion contacts the electrode body within the area of the power generating portion)

The description of the positional relationship of the end of the power generating portion 16a, the end of the thick portion 31a, and the end of the spacer 20 in the long direction (i.e., the Y-axis direction) will now be supplemented with reference to FIG. 7. FIG. 7 is a view of a case in which the thick portion 31a contacts the electrode body beyond the area of the power generating portion 16a (i.e., the boundary K in the drawing), and FIG. 8 is a view of a case in which the thick portion 31a contacts the electrode body 16 within the area of the power generating portion 16a (i.e., to the Y-axis direction side of the boundary K in the drawing). In these sectional views, the stacked positive electrode sheet 17a, negative electrode sheet 18a, and separator 19 of the electrode body 16 appear as multiple layers, but the cross-sections of the stacked positive electrode sheet 17a, negative electrode sheet 18a, and separator 19 are collectively represented by simple hatching for descriptive purposes. Also, the positive electrode collector portion 17 forms a portion of the electrode body 16, but in order to clearly distinguish the positive electrode collector portion 17 from the power generating portion 16a, the two are indicated by hatching in different directions.

FIG. 7 is a view of a case in which the thick portion 31a is of a size that extends beyond the area where the power generating portion 16a is in contact (i.e., the boundary K in FIG. 7), and the spacer 20 is also of a size that extends beyond the boundary K. The single cell 10 and the spacer 20 may also have such a positional relationship. That is, in the structure shown in FIG. 4, the thick portion 31a is formed extending beyond the area where the power generating portion 16a is in contact, and the spacer 20 is positioned within an area that is to the inside (i.e., to the Y-axis direction side of the boundary K in FIG. 4) of the area where the power generating portion 16a is in contact. In contrast, in the structure shown in FIG. 7, the spacer 20 is also of a size that extends beyond the area where the power generating portion 16a is in contact. The positional arrangement may be either that shown in FIG. 4 or that shown in FIG. 7.

Also, as shown in FIG. 8, the thick portion 31a may also be formed not extending beyond the area where the power generating portion 16a is in contact, but to the inside of this area. The area where the thick portion 31a is formed may be farther to the inside (in the positive direction of the Y-axis in FIG. 8) of the area where the power generating portion 16a is in contact than the boundary K between the power generating portion 16a and the positive electrode collector portion 17, and not crossing the boundary K. That is, as long as the thick portion 31a is formed so as to include a portion that contacts the power generating portion 16a, it does not have to include the entire portion that contacts the power generating portion 16a. The thick portion 31a may be formed on all or a portion of the portion that faces the power generating portion 16a. When the thick portion 31a is formed on a portion of the area where the power generating portion 16a is in contact (as shown in FIG. 4), although the uniformity does decrease compared to when the thick portion 31a is formed over the entire area where the power generating portion 16a is in contact (as shown in FIG. 7), pressure is still able to be applied almost uniformly to the power generating portion 16a.

The thickness of the thick portion 31a is set based on the type of metal material that the case main body 12 is made of, the thickness of the thin portion 31b, the area ratio of the thick portion 31a and the thin portion 31b, and the amount of pressure applied in the juxtaposing direction, and the like. More specifically, the thickness of the thick portion 31a is set to the appropriate optimum value based on results from testing and computer simulation. In one example, the size of the case main body 12 is 15 mm in the X-axis direction, 100 mm in the Z-axis direction, and 150 mm in the Y-axis direction. The case main body 12 is made of aluminum. The thickness of the thick portion 31a is 1.5 mm, and the thickness of the 31b is 0.5 mm. The depth and width of the grooves 23 provided in the spacer 20 is approximately 3 mm. In this example, the thickness of the thick portion 31a is three times the thickness of the thin portion 31b. When the wide side plate 31 is pressed in the juxtaposing direction by the comb-shaped spacer 20 when there is this much difference in thickness, the thick portion 31a does not deform by the grooves 23, and the thin portion 31b deforms by the pressure, so the thick portion 31a moves parallel in the juxtaposing direction and presses on the power generating portion 16a evenly. In the example described above, the width W1 of the thick portion 31a is three times the width W2 of the thin portion 31b. The width W1 of the thick portion 31a is preferably two or more times the width W2 of the thin portion 31b, and more preferably, three or more times the width W2 of the thin portion 31b. The spacer 20 is made of insulating resin.

Figure 9:
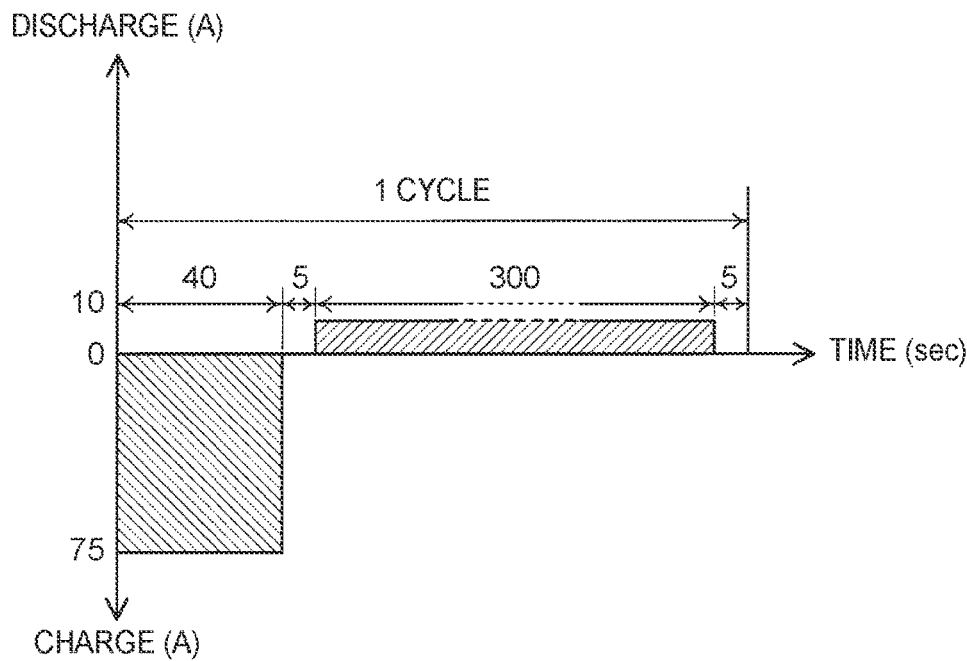
FIG. 9 is an explanatory view of a configuration example of a charging and discharging period and the like according to a low-temperature high-rate test.

Next, a low-temperature high-rate test of the battery pack 2 performed to verify the result of the thick portion 31a of the case main body 12 formed in this manner will be described. FIG. 9 is an explanatory view illustrating a configuration example of a charging and discharging period and the like according to the low-temperature high-rate test. In the low-temperature high-rate test, first, charging at 75 Amperes is performed for 40 seconds, and then after an interval period of 5 seconds, discharging at 10 Amperes is performed for 300 seconds. Then, after an interval period of 5 seconds, charging and discharging in this manner are repeated 4,000 times. That is, one cycle shown in FIG. 9 is repeated 4,000 times (4,000 cycles) in a predetermined low-temperature environment.

This kind of low-temperature high-rate test was performed for the configuration example shown in FIG. 4, the configuration example shown in FIG. 8, and Comparative examples 1 and 2. Then, a ratio of charging capacity before and after the test was calculated as a capacity retention rate (=(charging capacity after test/charging capacity before test)×100). In Comparative example 1, the thick portion 31a is not formed on the case main body 12, and the thickness of the entire case main body 12 is the same as that of the thin portion 31b. Also, in Comparative example 2, the thickness of the entire case main body 12 is the same as that of the thick portion 31a. A capacity retention rate as close to 100% as possible is preferable in order to inhibit a decrease in the charging capacity. The capacity retention rates obtained are as indicated below.

<Capacity Retention Rate after Low-Temperature High-Rate Test>
(1) Configuration example shown in FIG. 4: 99.7%
(2) Configuration example shown in FIG. 8: 96.1%
(3) Comparative example 1 (all thin): 93.8%
(4) Comparative example 2 (all thick): 89.3%

From the results above, it was verified that the configuration example shown in FIG. 4, i.e., the structure in which the thick portion 31a is formed in the area where the power generating portion 16a of the electrode body 16 is in contact, on the inside surface of the case main body 12, is best ((1) above). Also, the effect of the thick portion 31a of the case main body 12 to suppress a decrease in the charging capacity compared to the Comparative examples 1 and 2 was verified. Further, it was verified that the configuration example shown in FIG. 8, i.e., the structure in which the thick portion 31a does not extend beyond the area where the power generating portion 16a is in contact, but is formed to the inside of this area ((2) above), had the next best the capacity retention rate after the configuration example shown in FIG. 4, and was also superior to Comparative examples 1 and 2 in terms of suppressing a decrease in the charging capacity.

Figure 10:
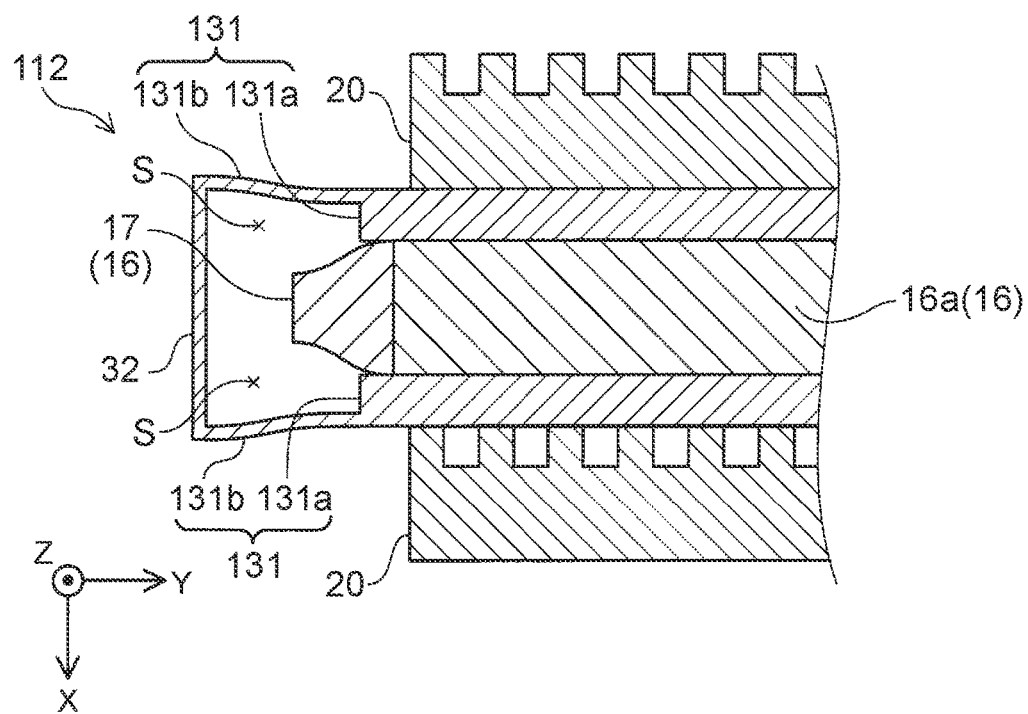
FIG. 10 is a partial sectional view of a sealed cell and a spacer illustrating a first modified example of the thick portion.
Figure 11:
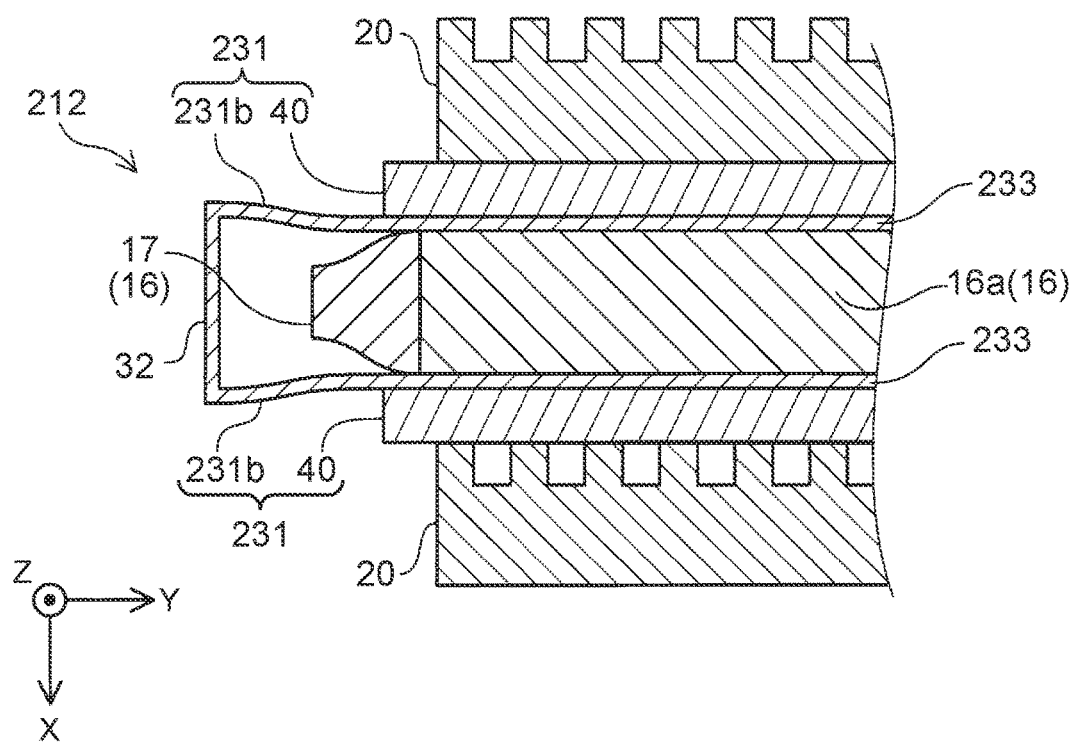
FIG. 11 is a partial sectional view of a sealed cell and a spacer illustrating a second modified example of the thick portion.

Examples of variations in the thick portion 31a provided on the case main body 12 will now be described with reference to FIGS. 10 to 12. FIGS. 10 and 11 are partial sectional views of the single cell 10 and the spacer 20 showing modified examples of the thick portion 31a. FIGS. 10 and 11 correspond to the sectional view taken along line IV-IV in FIG. 2. In these sectional views, the stacked positive electrode sheet 17a, negative electrode sheet 18a, and separator 19 of the electrode body 16 appear as multiple layers, but the cross-sections of the stacked positive electrode sheet 17a, negative electrode sheet 18a, and separator 19 are collectively represented by simple hatching for descriptive purposes. Also, the positive electrode collector portion 17 forms a portion of the electrode body 16, but in order to clearly distinguish the positive electrode collector portion 17 from the power generating portion 16a, the two are indicated by hatching in different directions.

First, the modified example in FIG. 10 will be described. The thick portion 31a illustrated in FIGS. 2 and 4 is flush with the thin portion 31b on the inside of the case main body 12, and protrudes from the thin portion 31b on the outside of the case main body 12. In the modified example shown in FIG. 10, a thick portion 131a is flush with a thin portion 131b on the outside of a case main body 112, and protrudes from the thin portion 131b on the inside of the case main body 112. With this structure as well, when stacking pressure is applied to the spacer 20 by the pressing mechanism, the thin portion 131b on both sides of the thick portion 131a bends toward the inside of the case main body 112 while the thick portion 131a remains flat. As a result, the power generating portion 16a inside the case main body 112 is pressed on substantially uniformly. Also, by providing the thick portion 131a on the inside surface of the case main body 112, a space S between the pair of thin portions 131b that face each other in the juxtaposing direction inside the case main body 112 is wider than it is in the case shown in FIGS. 2 and 4. The mode shown in FIG. 10 is advantageous in that the space S around the positive electrode collector portion 17 and the negative electrode collector portion 18 is wide.

Next, the modified example in FIG. 11 will be described. The thick portion may be made of a plurality of stacked plates. In other words, the wide side plate may be formed by a plurality of stacked plates. Typically, the wide side plate may be formed by a wide side plate that has a uniform thickness similar to the thickness of the thin portion described earlier, to which another flat plate has been attached in a region corresponding to the thick portion described earlier. In the case shown in FIG. 11, a flat plate 40 that has a thickness similar to that of the thick portion 31a of the example embodiment described earlier may be attached to a side surface of a flat portion 233 all of which has a thickness similar to that of the thin portion 31b, to form a thick portion. Even if this kind of flat plate 40 is assembled as a reinforcing plate, the portion with the flat plate 40 will not bend from stacking pressure. On the other hand, when stacking pressure is received, thin portions 231b on both sides will bend toward the inside of a case main body 212, and the portion with the flat plate 40 will move parallel toward the electrode body 16 without bending. Therefore, the power generating portion 16a in the case main body 212 will be pressed on substantially uniformly.

Next, an example shown in FIG. 12 will be described. FIG. 12 is a partial perspective view of a battery stack illustrating a battery pack according to a modified example. In this example, the size of a spacer 320 is smaller than that in the example embodiment described above. In particular, the length in the height direction (i.e., the Z-axis direction) of a single cell 310 is short. The spacer 320 abuts against substantially the center of a wide side plate 331 of a case main body 312 when viewed from the juxtaposing direction. A thick portion 331a provided on the wide side plate 331 is also smaller than that in the example embodiment described above, corresponding to the size of the spacer 320. In this example, a thin portion 331b is provided not only on both sides of the thick portion 331a in the direction along the rolling axis J, but also on both sides in a direction (i.e., the height direction of the single cell 310; the Z-axis direction in the drawing) orthogonal to both the rolling axis J and the juxtaposing direction. In other words, in this example, the thin portion 331b is provided surrounding the thick portion 331a when viewed from the juxtaposing direction, and the surface of the spacer 320 in which the grooves 23 are provided abuts against the thick portion 331a. In this example, when the thick portion 331a receives stacking pressure, the thin portion 331b bends around the thick portion 331a. Therefore, when the wide side plate 331 is pressed on in the juxtaposing direction, the thick portion 331a moves toward the electrode body 16 without deforming in either the direction of the rolling axis J or the height direction (i.e., the Z-axis direction in the drawing). In this example, pressure that is evenly distributed in both the direction of the rolling axis J and the height direction is able to be applied to the power generating portion 16a.

Figure 12:
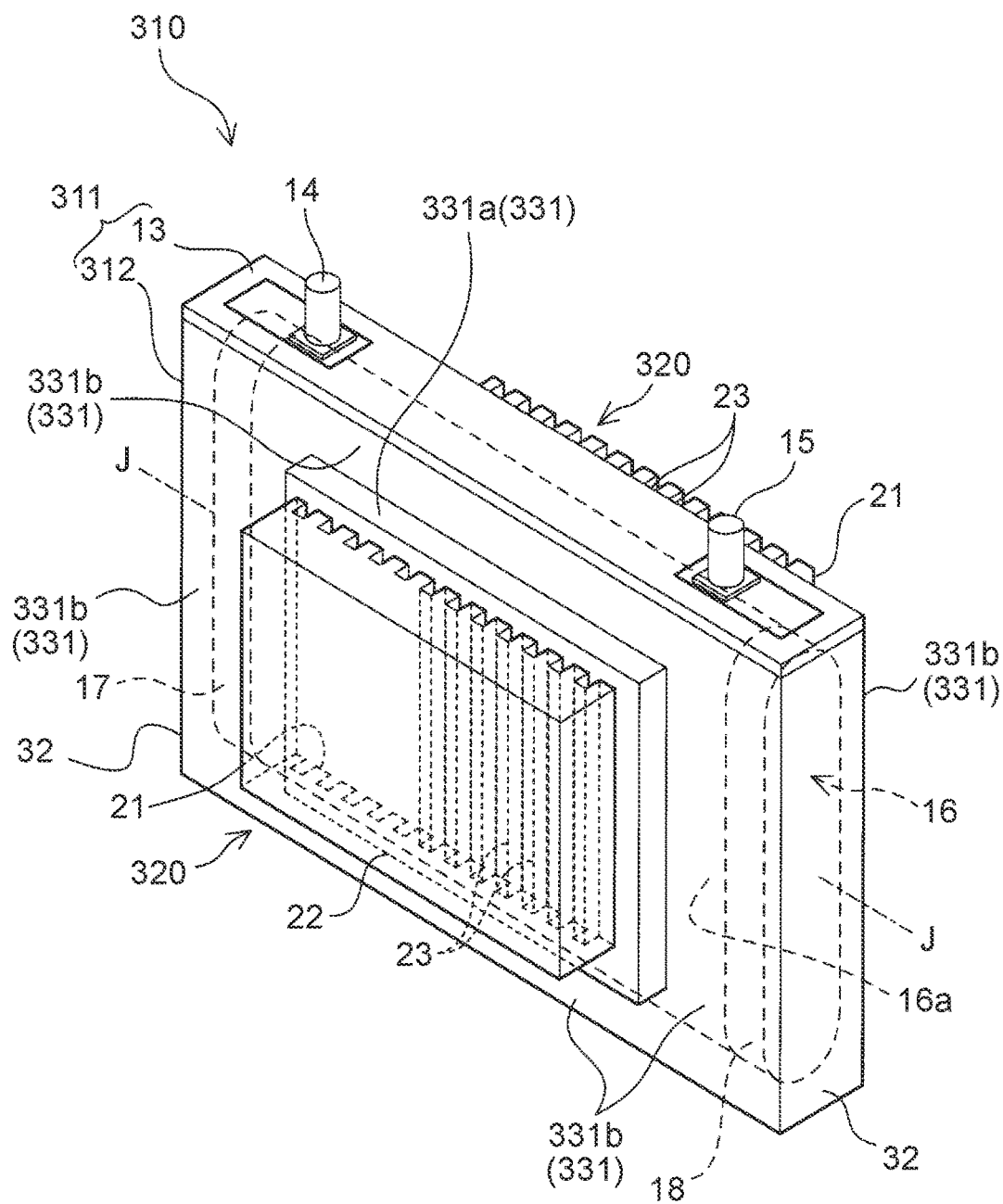
FIG. 12 is a partial perspective view of a battery stack for illustrating a battery pack according to a modified example.

The surface of the spacer provided with the grooves abuts against the case main body at only the thick portion of the case main body in all of the modified examples in FIGS. 10 to 12.

As described above, with the single cells 10 that form the battery pack 2 of the example embodiment, the thick portion 31a in which the portion contacting the power generating portion 16a of the electrode body 16 housed in the cell case 11 is made thick is formed on both side surfaces of the cell case 11 (i.e., the case main body 12) facing the juxtaposing direction. The thickness of the thick portion 31a is greater than the thickness of the thin portion 31b. As a result, even if a load is applied in the juxtaposing direction by the pressing mechanism, the cell case 11 (i.e., the case main body 12) will not easily deform in a wavy shape matching the grooves 23 at the thick portion 31a, nor will the cell case 11 (i.e., the case main body 12) easily bend at the thick portion 31a such that the space inside the cell case 11 (i.e., the case main body 12) becomes narrower around the contact portion with the spacer 20. Therefore, the thick portion 31a is kept flat and the thin portion 31b on both sides thereof bends toward the inside of the cell case 11 (i.e., the case main body 12), so the load is applied substantially evenly to the electrode body 16 (i.e., the power generating portion 16a) inside the cell case 11 (i.e., the case main body 12). Accordingly, a decrease in charging capacity due to a load applied to the electrode body 16 (i.e., the power generating portion 16a) becoming uneven is inhibited.

Next, points to note regarding the technology described in the example embodiment will be described. In the example embodiment described above, the grooves 23 formed in the spacer 20 are formed in the one surface 21 of the spacer 20, but the grooves 23 may also be formed in the other surface 22 as well. As a result, flow paths through which cooling fluid is able to flow are formed in both surfaces of the spacer 20, so the cooling effect is increased. Also, the grooves 23 are formed in striations (i.e., striated grooves) from one end side to the other end side of the spacer 20, but lattice grooves in which these kinds of striated grooves are formed in two directions so as to intersect each other may also be formed. As a result, the number of flow paths through which cooling fluid is able to flow is able to be further increased, so the cooling effect is able to be further increased.

In the example embodiment, several thick portions 31a, 131a and 331a are described, but in the description below, only reference character "31a" will be used when there is no need to distinguish among them. In the example embodiment described above, the thick portion 31a is formed on one surface, either the outside surface or the inside surface, of the case main body 12, but the thick portion 31a may also be formed on both the outside surface and the inside surface of the case main body 12. Therefore, the combined thickness of the side plates on both the outside surface and the inside surface need only be the same as that of the thick portion 31a, so the thick portion 31a formed on both side surfaces is able to be thinner than it is when the thick portion 31a is formed on only one surface, either the outside surface or the inside surface, of the case main body 12. Also, the thickness of the thick portion 31a formed on the inside surface can also be set to achieve the best physical and mechanical effects on the electrode body 16 (i.e., the power generating portion 16a) housed in the case main body 12, for example, by appropriately changing the ratio of the thick portion 31a formed on the outside surface and the thick portion 31a formed on the inside surface.

Also, in the example embodiment described above, the thick portion 31a is formed on the case main body 12 that forms the cell case 11. However, when the cover 13 has a flat rectangular shape like that of the case main body 12, instead of a strip shape, the thick portion 31a is preferably formed on both the cover 13 and the main body portion. This enables the entire area of the power generating portion of the electrode body housed in these to be covered by the thick portion.

Moreover, in the example embodiment described above, the electrode body 16 is housed with the rolling axis J facing the width direction (i.e., the Y-axis direction) in the cell case 11 that is longer in the width direction (i.e., the Y-axis direction) than the height direction (i.e., the Z-axis direction). Conversely, the electrode body 16 may be housed with the rolling axis J facing the height direction (i.e., the Z-axis direction), in a tall cell case that is longer in the high direction (i.e., the Z-axis direction) than the width direction (i.e., the Y-axis direction). In this case as well, a thick portion (corresponding to the thick portion 31a described above) formed on the cell case is formed in a direction orthogonal to the rolling axis J. That is, this thick portion is formed extending in a strip shape from one end side to the other end side in the width direction (i.e., the Y-axis direction) of the cell case. Further, the thick portion may also be formed on a portion of the cell case, instead of being formed in a strip shape in this way.

Moreover, in the example embodiment described above, the number of juxtaposed single cells 10 that form the battery pack 2 is six, but the number of juxtaposed single cells 10 is not limited to this as long as it is plural. Also, a lithium-ion secondary cell is given as one example of the single cell 10, but the single cell 10 is not limited to this as long as it is a non-aqueous electrolyte secondary cell.

In the battery pack 2 of the example embodiment, the spacer 20 has a plurality of grooves 23 in only the one surface 21 in the juxtaposing direction. The other surface 22 is flat. On the other hand, the single cell 10 is provided with the thick portion 31a and the thin portion 31b on the wide side plate 31 on both sides in the juxtaposing direction (see FIG. 4). The advantages described above are able to be obtained as long as the thick portion and the thin portion are provided at least on the side facing the side of the spacer that is provided with the grooves.

The thin portion is provided on both sides of the thick portion in the direction of the rolling axis. Therefore, when the rolled electrode body is housed in the case with the rolling axis facing the vertical direction, the thin portion is also preferably provided on both sides of the thick portion in the vertical direction. Naturally, the thin portion is preferably provided above, below, to the left, and to the right of the thick portion when viewed from the juxtaposing direction, as shown in FIG. 12.

As shown in FIG. 11, a thick portion may be such that a separate flat plate (the flat plate 40 in FIG. 11) is attached to a wide side plate of uniform thickness (the flat portion 233 in FIG. 11). In this case, the flat plate 40 does not have to be fixed to the flat portion 233 that is originally a wide side plate. For example, the flat plate 40 may also be attached to a spacer in advance. The thickness of the plate interposed between the surface of the spacer provided with the grooves and the rolled electrode body (i.e., the power generating portion) inside the case, in a completed battery pack, need only be greater than that of the thin portion.

In the battery pack of the example embodiment, a plurality of single cells and a plurality of spacers are juxtaposed alternately one-by-one. This means that any two adjacent single cells sandwich at least one spacer therebetween, such that the two single cells are separated. Even if the spacer is formed by a plurality of members, the spacer of the plurality of members that are sandwiched between two single cells is regarded as "one spacer". The invention includes a case in which two single cells are adjacent to each other without sandwiching a spacer, in just one location, for example, in the entire battery pack. The plurality of single cells and the plurality of spacers need only be juxtaposed alternately one-by-one in at least a portion of the battery pack.

The plurality of grooves provided in the spacer are not limited to being a groove of parallel grooves that extend from one end to the other end of the spacer. For example, the plurality of grooves may be provided in a lattice shape in the spacer. Also, each groove may be closed off in one plane of the spacer. That is, a plurality of depressions provided in the surface of the spacer is also one aspect of the "plurality of grooves" in this specification.

The single cell 10 corresponds to one example of the single cell. The cell case 11 corresponds to one example of the case. The electrode body 16 corresponds to one example of the rolled electrode body. The power generating portion 16a corresponds to one example of the "area where the positive electrode sheet and the negative electrode sheet overlap". The grooves 23 correspond to one example of the striated grooves. The battery stack 3 corresponds to one example of the juxtaposed body of the plurality of single cells 10 and the plurality of spacers 20. The wide side plate 31, 131, 231, and 331 corresponds to one example of the "side plate of the case that faces the side plate of the spacer in which the plurality of grooves are provided".

The battery pack of the example embodiment is a device that is mounted in an electric vehicle or a hybrid vehicle. The invention is not limited to a battery pack to be mounted in a vehicle.

Heretofore, specific examples of the invention have been described in detail, but these are merely examples and in no way limit the scope of the claims. The technology described within the scope of the claims also includes various modifications of the specific examples described above. Also, the technical elements illustrated in the specification and the drawings display technical utility both alone and in various combinations. Further, the technology illustrated in the specification and the drawings simultaneously achieves a plurality of objects, and has technical utility by simply achieving one of these objects.

What is claimed is:

1. A battery pack comprising:
   a plurality of non-aqueous electrolyte single cells, each single cell being such that a rolled electrode body in which a positive electrode sheet, a negative electrode sheet, and a separator sandwiched are flatly rolled, is housed in a flat case;
   a plurality of spacers that are juxtaposed in a predetermined direction alternately with the plurality of single cells; and
   a banding member that applies pressure in the predetermined direction to a juxtaposed body that includes the plurality of single cells and the plurality of spacers, and bands the juxtaposed body together, wherein
   the rolled electrode body includes a collector portion provided on both ends in a rolling axis direction, and a power generating portion positioned between the collector portion on both ends;
   each spacer has a recessed portion provided on at least one surface that faces the single cell adjacent to the spacer; and
   a side plate of the case that faces the surface of the spacer on which the recessed portion is provided includes a thick portion that contacts the power generating portion of the rolled electrode body inside the case, and a thin portion that is thinner than the thick portion and is continuous with both sides of the thick portion in the rolling axis direction, and the surface of the spacer on which the recessed portion is provided abuts against only the thick portion.

2. The battery pack according to claim 1, wherein a width of the thick portion in the rolling axis direction is greater than a width of the power generating portion in the rolling axis direction.

3. The battery pack according to claim 1, wherein the thick portion is formed by a separate flat plate being attached to a flat plate having a thickness of the thin portion.

4. The battery pack according to claim 1, wherein the thin portion is provided surrounding the thick portion when viewed from the predetermined direction.

5. The battery pack according to claim 1, wherein the recessed portion is provided in plurality.

6. The battery pack according to claim 1, wherein the recessed portion is a groove.

7. The battery pack according to claim 6, wherein the groove is a striated groove.

8. The battery pack according to claim 6, wherein the groove is a lattice groove.

* * * * *